US008230003B2

(12) United States Patent
Oh et al.

(10) Patent No.: US 8,230,003 B2
(45) Date of Patent: Jul. 24, 2012

(54) XDM SYSTEM AND METHOD FOR IMPLEMENTING XML DOCUMENT MANAGEMENT FUNCTION BY USING POSITION DESCRIPTION OF XML DOCUMENT

(75) Inventors: Jae-Kwon Oh, Seoul (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 51 days.

(21) Appl. No.: 11/840,076

(22) Filed: Aug. 16, 2007

(65) Prior Publication Data

US 2008/0046482 A1 Feb. 21, 2008

(30) Foreign Application Priority Data

Aug. 16, 2006 (KR) .................. 10-2006-0077036

(51) Int. Cl.
*G06F 15/16* (2006.01)
(52) U.S. Cl. ...................... 709/203; 709/223
(58) Field of Classification Search .................. 709/203, 709/223–224, 217, 230
See application file for complete search history.

(56) References Cited

U.S. PATENT DOCUMENTS

| 6,993,525 | B1 | 1/2006 | Imago | |
|---|---|---|---|---|
| 7,155,248 | B2* | 12/2006 | Idnani | 370/312 |
| 7,324,505 | B2* | 1/2008 | Hoover | 370/352 |
| 2003/0236903 | A1 | 12/2003 | Piotrowski | |
| 2005/0226174 | A1 | 10/2005 | Kiss | |
| 2005/0267936 | A1* | 12/2005 | Poikselka | 709/204 |
| 2006/0053208 | A1 | 3/2006 | Laurila et al. | |
| 2006/0235981 | A1* | 10/2006 | Westman et al. | 709/227 |
| 2007/0043692 | A1* | 2/2007 | Oh et al. | 707/1 |
| 2007/0058792 | A1* | 3/2007 | Chaudhari et al. | 379/88.17 |
| 2007/0088670 | A1* | 4/2007 | Laurila | 707/1 |
| 2007/0118660 | A1* | 5/2007 | Garcia-Martin | 709/227 |
| 2007/0136475 | A1* | 6/2007 | Leppisaari et al. | 709/227 |
| 2007/0172044 | A1* | 7/2007 | Nguyen | 379/202.01 |
| 2008/0046482 | A1* | 2/2008 | Oh et al. | 707/203 |
| 2008/0281931 | A1* | 11/2008 | Oh et al. | 709/206 |

(Continued)

FOREIGN PATENT DOCUMENTS

JP 2001-084169 3/2001

(Continued)

OTHER PUBLICATIONS

Rosenberg,"The Extensible Markup Language (XML) Configuration Access Protocol (XCAP)", IETF, Jun. 11, 2005.*

(Continued)

*Primary Examiner* — Philip B Tran
(74) *Attorney, Agent, or Firm* — The Farrell Law Firm, P.C.

(57) ABSTRACT

A method for indirectly creating an XML (eXtensible Markup Language) document in an XDMS (XML Document Management Server) by using a URL (Uniform Resource Locator), which indicates the position of an XCAP (XML Configuration Access Protocol) document, in an XDM (XML Document Management) system including an XDMC (XDM Client) and an XDMS. The method includes transmitting an XCAP PUT request message, which contains an XCAP URI (Uniform Resource Identifier) and a storage position of an XML document to be created, to a corresponding XDMS by the XDMC; and receiving the XCAP PUT request message by the XDMS, retrieving an XML document corresponding to the XCAP URI contained in the XCAP PUT request message, and storing the XML document in the storage position.

20 Claims, 4 Drawing Sheets

U.S. PATENT DOCUMENTS

2008/0319948 A1* 12/2008 Berg et al. .................. 709/203

FOREIGN PATENT DOCUMENTS

| | | |
|---|---|---|
| JP | 2004-096582 | 3/2004 |
| JP | 2006-113710 | 4/2006 |
| JP | 2008-512911 | 4/2008 |
| KR | 1020040001010 | 1/2004 |
| KR | 1020050060803 | 6/2005 |
| KR | 1020060070415 | 6/2006 |

OTHER PUBLICATIONS

"XML Document Management Architecture", Open Mobile Alliance (OMA), Jun. 28, 2005.*

N. Freed et al., "Definition of the URL Mime External-Body Access-Type", Oct. 1996.

E. Burger, "A Mechanism for Content Indirection in Session Initiation Protocol (SIP) Messages", Cantata Technology, Inc., May 2006.

Open Mobile Alliance: "XML Document Management (XDM) Specification", OMA-TS-XDM_Core-V1_0-20060110-C, XP-002510122, Jan. 10, 2006.

E. Nebel et al., "Form-Based File Upload in HTML", The Internet Engineering Task Force (IETF), XP-002661855, Nov. 1, 1995.

Fumitoshi Ukai, What is UNIX 11th Use of Network, UNIX USER vol. 2, No. 6, Softbank Corp., Jun. 1, 1993.

* cited by examiner

XDM SYSTEM AND METHOD FOR IMPLEMENTING XML DOCUMENT MANAGEMENT FUNCTION BY USING POSITION DESCRIPTION OF XML DOCUMENT

PRIORITY

This application claims priority under 35 U.S.C. §119(a) to an application filed in the Korean Industrial Property Office on Aug. 16, 2006 and assigned Serial No. 2006-77036, the contents of which are incorporated herein by reference.

BACKGROUND OF THE INVENTION

1. Field of the Invention

The present invention generally relates to an OMA (Open Mobile Alliance) XDM (eXtensible Markup Language (XML) Document Management) service enabler, and more particularly to an XDM system and a method using the position description of an XML document.

2. Description of the Related Art

As generally known in the art, an XDM v1.0 service enabler implements an XDM operation for creating an XML document in an XDMS (XDM Server) by transmitting an XML document, which is to be created, to the XDMS while being contained in an XCAP (XML Configuration Access Protocol) PUT request message.

The flow of messages during an XDM operation for creating an XML document of URI (Uniform Resource Identifier) list in a shared XDMS will now be described with reference to FIG. 1, and Tables 1 and 2 given below.

An XDMC (XDM Client) transmits an XCAP PUT request message, which contains an XML document to be created, to the XDMS in step 10 of FIG. 1. When the XCAP PUT request message is composed as shown in Table 1, the XDMC may use the XCAP PUT request message to request that the friends.xml document, which contains a URI list included in the content body, be created in the user directory of sip:jay@example.com.

TABLE 1

PUT http://xcap.example.com/resource-lists/users/sip:jay@example.com/friends.xml HTTP/1.1 ↵
Host: xcap.example.com ↵
User-Agent: XDM-client/OMA1.0 ↵
Date: Thu, 25 July 2006 18:59:57 GMT+9 ↵
X-XCAP-Asserted -Identity: "sip:jay@example.com " ↵
Content-Type: application/resource-lists+xml ↵
Content-Length: (_) ↵
↵
<?xml version="1.0" encoding="UTF-8"?> ↵
<resource-lists xmlns="urn:ietf:params:xml:ns:resource-lists"> ↵
  <list name="My_friends"> ↵
    <entry uri="sip:friend1@example.com"> ↵
      <display-name>Friend1</display-name> ↵
    </entry> ↵
  </list> ↵
</resource-lists> ↵

Upon receiving the XCAP PUT request message shown in Table 1, the XDMS creates a corresponding XML document and transmits an XCAP 201 Created message 12 of FIG. 1 to the XDMC to inform of successful creation. The XCAP 201 Created message 12 of FIG. 1 is composed as shown in Table 2 below.

TABLE 2

HTTP/1.1 201 CREATED ↵
Server: XDM-serv/OMA1.0 ↵
Date: Thu, 25 July 2006 19:00:00 GMT+9 ↵
Etag: "eti87" ↵
Content-Length: 0 ↵

As mentioned above, an XML document can be created in the XDMS using the XDM of XDM v1.0 service enabler. Furthermore, an XDM v2.0 service enabler supports new XDM functions, including XDM Copying and XDM Forwarding. These functions are used to retrieve an XML document already existing in the XDMS or deliver the XML document to another user [XDM2_RD] (Reference: "OMA XML Document Management Requirements," Version 2.0, Open Mobile Alliance, OMA-RD-XDM-V2_0, URL:http://www.openmobilealliance.org/). Therefore, when these are implemented by using an existing XDM function for creating an XML document in the XDMS, the XDMC transmits an XCAP GET request to retrieve a corresponding XML document from the XDMS in steps 20 and 22 of FIG. 2. Then, the XDMC adds the XML document, which has been retrieved from the XDMS, to an XCAP PUT request so the document is created and stored in a desired XDMS in steps 24 and 26 of FIG. 2.

The fundamental reason for the above-mentioned process is that, in order to create a new XML document in the XDMS, the corresponding XML document needs to be included in the XCAP PUT request, as has been described with regard to the creation of an XML document in the XDMS by the XDM v1.0 service enabler.

In other words, the XDMC retrieves an XML document, which is already stored in the XDMS, and stores the XML document again in the XDMS. This results in the redundant information being exchanged, and thus causing signaling overhead. Further, considering that the XDM service enabler provides services in wireless environments and thus that the above-mentioned signaling occurs over a wireless channel, such signaling overhead would result in resource waste and processing time delay.

SUMMARY OF THE INVENTION

Accordingly, in the purpose to solve the above-mentioned problems occurring in the prior art the present invention provides a system and a method for indirectly creating an XML document in an XDMS by using the URL (Uniform Resource Locator) of an XCAP document.

Also, the present invention provides a system and a method for concretely implementing the XDM Copying function of an XDM v2.0 service enabler by indirectly creating an XML document in an XDMS by using the URL of an XCAP document.

In accordance with an aspect of the present invention, there is provided an XDM system for realizing an XML document management function, the XDM system including an XDMC for transmitting an XCAP PUT request message to a corresponding XDMS, the XCAP PUT request message containing an XCAP URI and a storage position of an XML document to be created; and an XDMS for receiving the XCAP PUT request message, retrieving an XML document corresponding to the XCAP URI contained in the XCAP PUT request message, and storing the XML document in the storage position.

In accordance with another aspect of the present invention, there is provided a method for implementing an XML document management function in an XDM system having an XDMC and an XDMS, the method including transmitting an XCAP PUT request message to a corresponding XDMS by the XDMC, the XCAP PUT request message containing an XCAP URI and a storage position of an XML document to be created; and receiving the XCAP PUT request message by the XDMS, retrieving an XML document corresponding to the XCAP URI contained in the XCAP PUT request message, and storing the XML document in the storage position.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
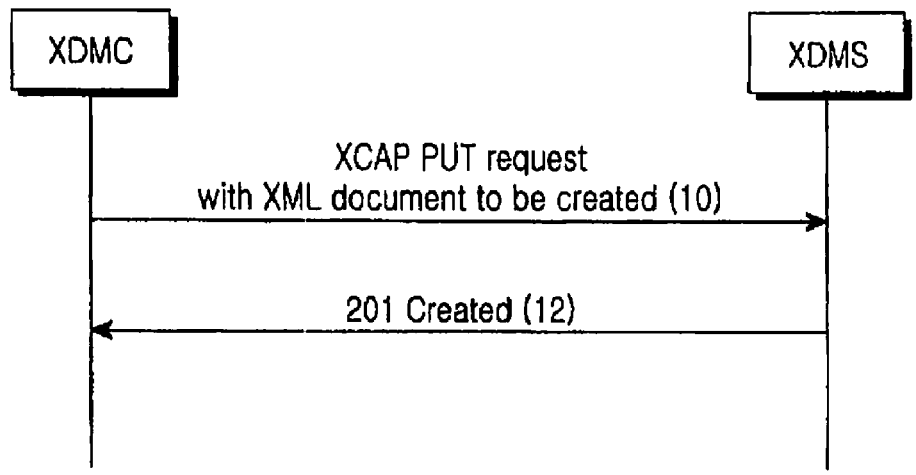
FIG. 1 is a flowchart showing a process for creating an XML document in an XDMS according to the prior art.
Figure 2:
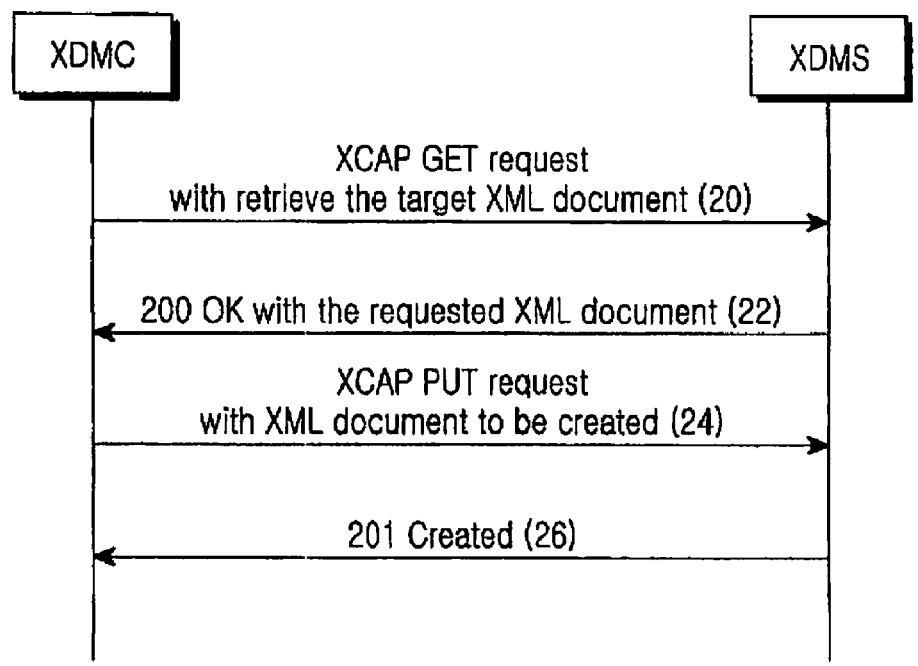
FIG. 2 is a flowchart showing a process for implementing a forwarding/copying function according to the prior art.

Hereinafter, preferred embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a description of known functions and configurations incorporated herein will be omitted when it may make the subject matter of the present invention rather unclear.

A method for indirectly creating an XML (eXtensible Markup Language) document in an XDMS (XML Document Management Server) by using the URL (Uniform Resource Locator) of an XCAP (XML Configuration Access Protocol) document to improve the XDM (XML Document Management) function of an XDM v2.0 service enabler, as well as a method for implementing XDM creation and copying functions according to the present invention will now be described with reference to the accompanying drawings.

A method for using the URL of an XML document to indirectly describe the corresponding XML document in an XCAP request will now be described.

According to the disclosure of "Definition of the URL MIME External-Body Access-Type," N. Freed, et al., RFC (Request For Comment) 2017, October 1996, URL: http://www.ietf.org/rfc/rfc2017.txt [RFC2017] and "A Mechanism for Content Indirection in Session Initiation Protocol (SIP Messages)," E. Burger, Ed., RFC 4483, May 2006, URL: http://www.ietf.org/rfc/rfc4483.txt [RFC4483], an object is not directly described in an HTTP (HyperText Transport Protocol) or SIP request, but only the URL of the object is contained in the HTTP or SIP request so as to indirectly describe the object (i.e. 'message/external-body' MIME (Multimedia Internet Message Extensions) type).

The present invention utilizes such 'message/external-body' MIME type to directly express an XML document by describing only the XCAP URI (Uniform Resource Identifier) of the XML document in the XCAP request. The XCAP URI of the XML document refers to the storage position of the XML document in the XDMS, and is obtained by concatenating the XCAP root URI to an XCAP document selector [XDM_Core] (reference: "XML Document Management (XDM) Specification,"Version 1.0, Open Mobile Alliance™, OMA-TS-XDM_CORE-V1_0, URL:http://www.openmobilealliance.org/). Based on the 'message/external-body' MIME type, an XCAP PUT request message containing only the XCAP URI of an XML document is obtained as given Table 3 below.

TABLE 3

PUT http://xcap.example.com/org.openmobilealliance.poc/users/
  sip:copyer@example.com/copyed-poc-group.xml HTTP/1.1 ↵
Host: xcap.example.com ↵
User-Agent: XDM-client/OMA1.0 ↵
Date: Wed, 26 July 2006 22:03:33 GMT+9 ↵
X-XCAP-Asserted-Identity: "sip:copyer@example.com" ↵
Content-Type: mesaage/external-body; ↵
  ACCESS-TYPE=URL; ↵
  URL="http://xcap.example.com/org.openmobilealliance.poc/users/
  sip:copyee@example.com/source-poc-group.xml"; ↵
  size=__ ↵
Content-Length: (_) ↵
↵
Content-Type: application/vnd.oma.poc.groups+xml ↵
↵

Referring to Table 3, "message/external-body Content-Type" means that the content of this XCAP request is an external object. In addition, "ACCESS-TYPE," "URL," and "size" are optional parameters of "message/external-body Content-Type," and respectively mean that the corresponding external object will be accessed based on its URL, that the URL is the XCAP URI of "http://xcap.example.com/org.openmobilealliance.poc/users/sip:copyee@example.com/source-poc-group.xml," and that the external object has a specific size. The content type of the external object is described again below "Content-Type: message/external-body," and "Content-Type: application/vnd.oma.poc-.groups+xml" means that the content type of the external object existing in the URL corresponds to a PoC (Push to talk over Cellular) group XML document.

It is possible to express a number of external objects by using a multipart MIME type. An example of describing two PoC group XML documents with regard to their XCAP URI only to indirectly express them in an XCAP request is given in Table 4 below.

TABLE 4

PUT http://xcap.exmple.com/org.openmobilealliance.poc/users/
  sip:copyer@example.com/ HTTP/1.1 ↵
Host: xcap.example.com ↵
User-Agent: XDM-client/OMA1.0 ↵
Date: Wed, 26 July 2006 22:03:33 GMT+9 ↵
X-XCAP-Asserted-Identity: "sip:copyer@example.com" ↵
Content-Type: multipart/mixed, boundary=zz993453 ↵

TABLE 4-continued

```
Content-Length: (_)
--zz993453
Content-Type: message/external-body;
    ACCESS-TYPE=URL;
    URL="http://xcap.example.com/org.openmobilealliance.poc/users/
        sip:copyee@example.com/source-poc-group.xml";
    size=_
Content-Type: application/vnd.oma.poc.groups+xml
Content-Description: First PoC Group XML document
--zz993453
Content-Type: message/external-body;
    ACCESS-TYPE=URL;
    URL="http://xcap.example.com/org.openmobilealliance.poc/users/
        sip:copyee@example.com/source-poc-group2.xml";
    size=_
Content-Type: application/vnd.cma.poc.groups+xml
Content-Description: Second PoC Group XML document
--zz993453
```

According to another aspect of the present invention, an alternative to the above-mentioned method is provided. Particularly, a method for defining a new XML application MIME type to indirectly express the corresponding XML document in an XML. For convenience, the XML document uses "application/vnd.oma.external-body+xml" as the name of the new MIME type. The XML information contains the XCAP URI of the corresponding external object, i.e. XML document, as in the above-mentioned method, and other pieces of information, e.g. size, content type etc., are optionally described. Tables 5 and 6 below respectively show the examples given in Tables 3 and 4, respectively, after modified and expressed in the XML type.

TABLE 5

```
PUT http://xcap.example.com/org.openmobilealliance.poc/users/
    sip:copyer@example.com/copyed-poc-group.xml HTTP/1.1
Host: xcap.example.com
User-Agent: XDM-client/OMA1.0
Date: Wed, 26 July 2006 22:03:33 GMT+9
X-XCAP-Asserted-Identity: "sip:copyer@example.com"
Content-Type: application/vnd.oma.external-body+xml
Content-Length: (_)
<?xml version="1.0" encoding="UTF-8"?>
<external-bodys>
    <external-body
    URL="http://xcap.example.com/org.openmobilealliance.poc/users/
        sip:copyee@example.com/source-poc-group.xml">
        <size>_</size>
        <Content-Type>application/vnd.oma.poc.groups+xml</Content-Type>
    </external-body>
</external-bodys>
```

TABLE 6

```
PUT http://xcap.example.com/org.openmobilealliance.poc/users/
sip:copyer@example.com/ HTTP/1.1
Host: xcap.example.com
User-Agent: XDH-client/OMA1.0
Date: Wed, 26 July 2006 22:03:33 GHT+9
X-XCAP-Asserted-Identity: "sip:copyer@example.com"
Content-Type: application/vnd.oma.external-body+xml
```

TABLE 6-continued

```
Content-Length: (_)
<?xml version="1.0" encoding="UTF-8"?>
<external-bodys>
    <external-body
    URL="http://xcap.example.com/org.openmobilealliance.poc/users/
        sip:copyee@example.com/source-poc-group,xml">
        <size>_</size>
        <Content-Type>application/vnd.oma.poc.groups+xml</Content-Type>
        <Content-Description> First PoC Group XML document</Content-Description>
    </external-body>
    <external-body
    URL="http://xcap.example.com/org.openmobilealliance.poc/users/
        sip:copyee@example.com/source-poc-group.xml>
        <size>_</size>
        <Content-Type>applicaction/vnd.oma.poc.groups+xml</Content-Type>
        <Content-Description> Second PoC Group XML document</Content-Description>
    </external-body>
</external-bodys>
```

A method for indirectly creating an XML document in an XDMS by describing the XCAP URI of the XML document will now be described.

The present invention provides a procedure for creating an XML document in an XDMS by describing the XCAP URI of the corresponding XML document, rather than containing the document itself, in an XCAP PUT request message. The procedure will be described with reference to two cases. In the first case, an XDMS storing an XML document, which has been described with regard to the XCAP URI of the XML document, is in the same domain as an XDMS, in which a corresponding XML document is to be newly created (i.e. single domain). In the second case, an XDMS storing an XML document, which has been described with regard to the XCAP URI of the XML document, is in a domain different from that of an XDMS, in which a corresponding XML document is to be newly created (i.e. multiple domains).

A procedure will now be described with reference to FIG. 3 based on the first case (single domain), i.e. based on an assumption that an XDMS storing an XML document, which has been described with regard to the XCAP URI of the XDMS, is in the same domain as the XDMS, in which a corresponding XML document is to be newly created.

A user or an XDMC sends an XCAP PUT request message, which contains the XCAP URI of an XML document to be created, to a corresponding XDMS in step 30. Based on the XCAP URI contained in the XCAP PUT request, the XDMS confirms that the corresponding XML document is stored in the XDMS in step 32 of FIG. 3. Then, the XDMS retrieves the corresponding XML document, checks the storage position in the XCAP PUT request message, creates the XML document, and stores the XML document in the requested position. The XDMS transmits a 201 Created message to the XDMS to inform that the corresponding XML document has been successfully created in step 34 of FIG. 3.

The above-mentioned Tables 3 and 5 give examples of the XCAP PUT request message shown in FIG. 3, and the XCAP PUT request message is processed in the following manner based on the process shown in FIG. 3.

1. A user represented by "sip:copyer@example.com" requests that a PoC group XML document described as "http://xcap.example.com/org. openmobilealliance.poc/users/sip:copye@example.com/source-poc-group.xml" be created as a PoC group XML document named "copyed-poc-group.xml" in his/her user directory described as "/users/sip:copyer@example.com" within a PoC XDMS described as "http://xcap.example.com/org.openmobilealliance.poc."

2. The corresponding PoC XDMS confirms that the requested PoC group XML document is stored in it, retrieves a "source-poc-group.xml" PoC group document from a user directory of "sip:copye@example.com," and creates a document named "copyed-poc-group.xml" in a user directory of "sip:copyer@example.com."

3. The corresponding PoC XDMS informs a user represented by "sip:copyer@example.com" of the result of successful creation of the XML document.

The second case (i.e. multiple domains), in which an XML document to be created is in the XMS of a different domain, will now be described with reference to FIG. 4, which is the same as FIG. 3 except that an XDMS in domain A, i.e. an XDMS in which an XML document is to be created, directly retrieves an XML document stored in an XDML of domain B by using an XCAP GET request message. This case will now be described with reference to FIG. 4.

Figure 4:
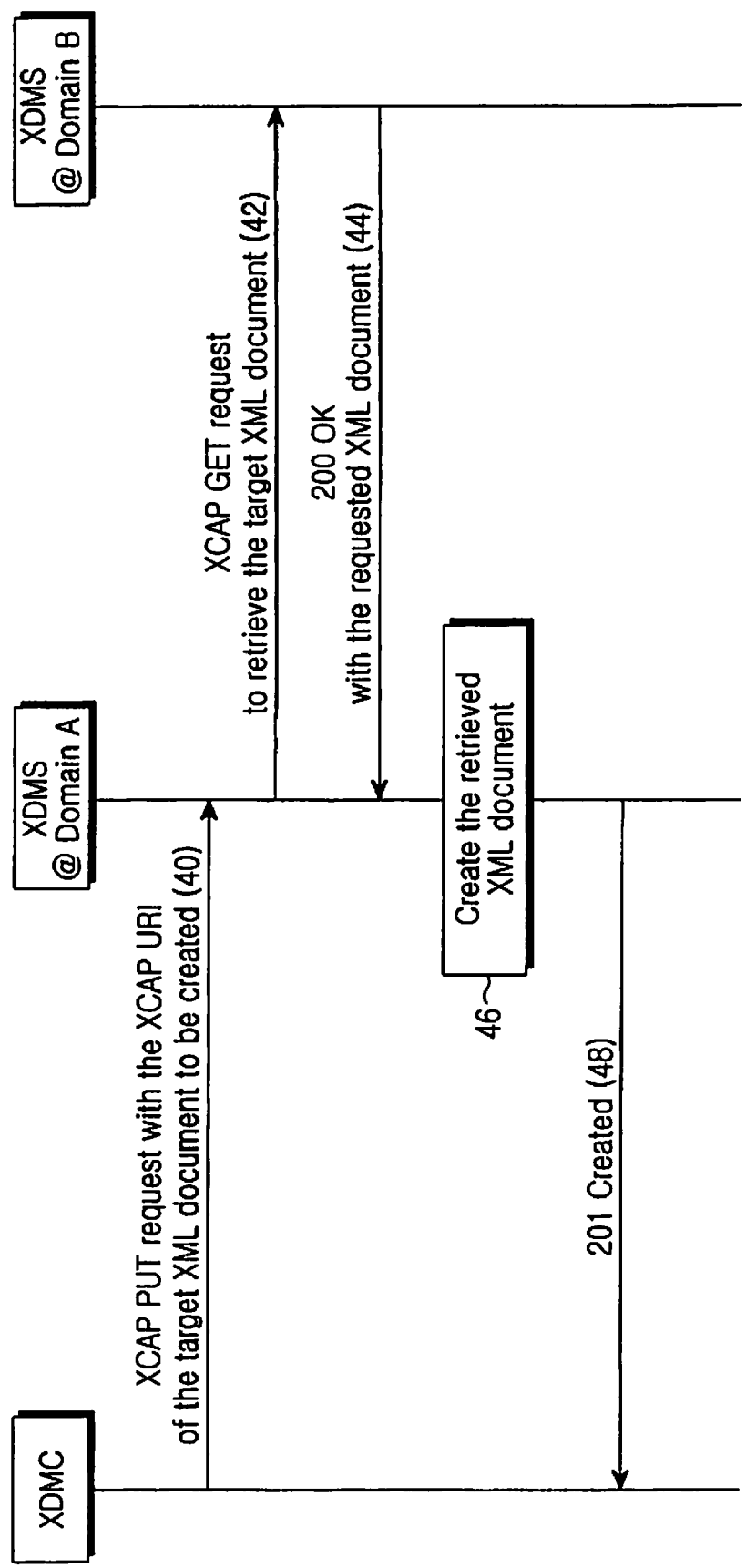
FIG. 4 is a flowchart showing a process for indirectly creating an XML document by using the XCAP URI of an XML document in multiple domains according to the present invention.

A user or an XDMC sends an XCAP PUT request message, which contains the XCAP URI of an XML document to be created, to a corresponding XDMS in step 40 of FIG. 4. Based on the XCAP URI contained in the XCAP PUT request message, the XDMS in domain A confirms that the corresponding XML document is stored in a different XDMS, i.e. XDMS in domain B, and sends an XCAP GET request message regarding the XML document in step 42 of FIG. 4. In this case, both XDMSs have the same application ID.

Upon receiving the XCAP GET request message, the XDMS in domain B sends the requested XML document to the XDMS in domain A in response to the XCAP GET request in step 44. Then, the XDMS in domain A checks the position, in which the transmitted XML document is to be stored, based on the XCAP PUT request message, creates a document, and stores the XML document in the requested position. The XDMS in domain A transmits a 201 Created message to the XDMC to inform that the corresponding XML document has been successfully created in step 48.

The following Tables 7, 8, and 9 give examples of the XCAP PUT request message transmitted in step 40 of FIG. 4, the XCAP GET request message transmitted in step 42 of FIG. 4, and XCAP GET response message transmitted in step 44 of FIG. 4, respectively.

TABLE 7

PUT http://xcap.example.com/org.openmobilealliance.poc/users/
    sip:copyer@example.com/copyed-poc-group.xml HTTP/1.1 ↵
Host: xcap.example.com ↵
User-Agent: XDH-client/OMA1.0 ↵
Date: Wed, 26 July 2006 22:03:33 GHT+9 ↵
X-XCAP-Asserted-Identity: "sip:copyer@example.com" ↵
Content-Type: message/external-body; ↵
    ACCESS-TYPE=URL; ↵
    URL="http://xcap.example2.com/org.openmobilealliance.poc/users/
    sip:copyee@example2.com/source-poc-group.xml"; ↵
    size=__ ↵
Content-Length: (__) ↵
↵
Content-Type: application/vnd.oma.poc.groups+xml ↵
↵

TABLE 8

GET http://xcap.example2.com/org.openmobilealliance.poc/users/
    sip:copyee@example.com/source-poc-group.xml HTTP/1.1 ↵
Host: xcap.example.com ↵
User-Agent: XDH-client/OHA1.0 ↵
Date: Wed, 26 July 2006 22:03:35 GHT+9 ↵
X-XCAP-Asserted-Identity: "sip:copyer@example.com" ↵
Content-Length: 0 ↵
↵

TABLE 9

HTTP/1.1 200 OK ↵
Server: XDH-serv/OHA1.0 ↵
Date: Wed, 26 July 2006 22:03:40 GHT+9 ↵
E-tag: "eti87" ↵
Content-Type: application/vnd.oma.poc.groups+xml ↵
Content-Length: (__) ↵
↵
<?xml version="1.0" encoding="UTF-8"?> ↵
<group xmlns="urn:oma:xml:poc:list-service" ↵
    xmlns:rl="urn:ietf:params:xml:ns:resource-lists" ↵
    xmlns:cr="urn:ietf:params:xml:ns:common-policy" ↵
    xmlns:xsi="http://www.w3.org/2001/XMLSchema-instance"> ↵
↵
    <list-service uri="sip:myconference@example.com"> ↵
        <display-name xml:lang="en-us">Friends</display-name> ↵
        <list> ↵
            <entry uri="tel:+43012345678"/> ↵
            <entry uri="sip:hermione.blossom@example.com"/> ↵
        </list> ↵
↵
        <max-participant-count>10</max-participant-count> ↵
        <cr:ruleset> ↵
            <cr:rule id="a7c"> ↵
                <cr:conditions> ↵
                    <is-list-member/> ↵
                </cr:conditions> ↵
                <cr:actions> ↵
                    <join-handling>true</join-handling> ↵
                    <allow-anonymity>true</allow-anonymity> ↵
                </cr:actions> ↵
            </cr:rule> ↵
        </cr:ruleset> ↵
    </list-service> ↵
</group> ↵
↵

Referring to Table 7, based on the XCAP URI contained in the XCAP PUT request message shown in Table 7, the PoC XDMS in domain "xcap.example.com" confirms that the requested PoC group XML document is stored in the PoC XDMS in domain "xcap.example2.com." Then, the PoC XDMS in domain "xcap.example.com" sends an XCAP GET request message (shown in Table 8) to the PoC XDMS in domain "xcap.example2.com." The request line of the XCAP GET request message shown in Table 8 corresponds to the XCAP URI of the PoC group document transmitted via the XCAP PUT request message shown in Table 7, and "X-XCAP-Asserted-Identify" becomes "sip:copyer@example.com" just like the XCAP PUT request shown in Table 7.

The PoC XDMS in domain "xcap.example2.com" retrieves the corresponding PoC group document, adds the PoC XDMS document to the response message shown in Table 9, and sends the PoC XDMS document to the PoC XDMS in domain "xcap.example.com."

Upon receiving the PoC group document, the PoC XDMS in domain "xcap.example.com" creates an XML document of "copyed-poc-group.xml" in a user directory of "sip:copyer@example.com" as specified in the request line of the XCAP PUT request shown in Table 7, and stores the transmitted PoC group document.

Although it has been described how to indirectly create an XML document in an XDMS by using the XCAP URI description with regard to a single XML document, it is also possible to indirectly create XML documents in XDMSs by using the XCAP URI description with regard to a plurality of XML documents.

A method for creating XML documents in XDMSs by using the XCAP URI description of a plurality of XML documents will now be described.

Figure 3:
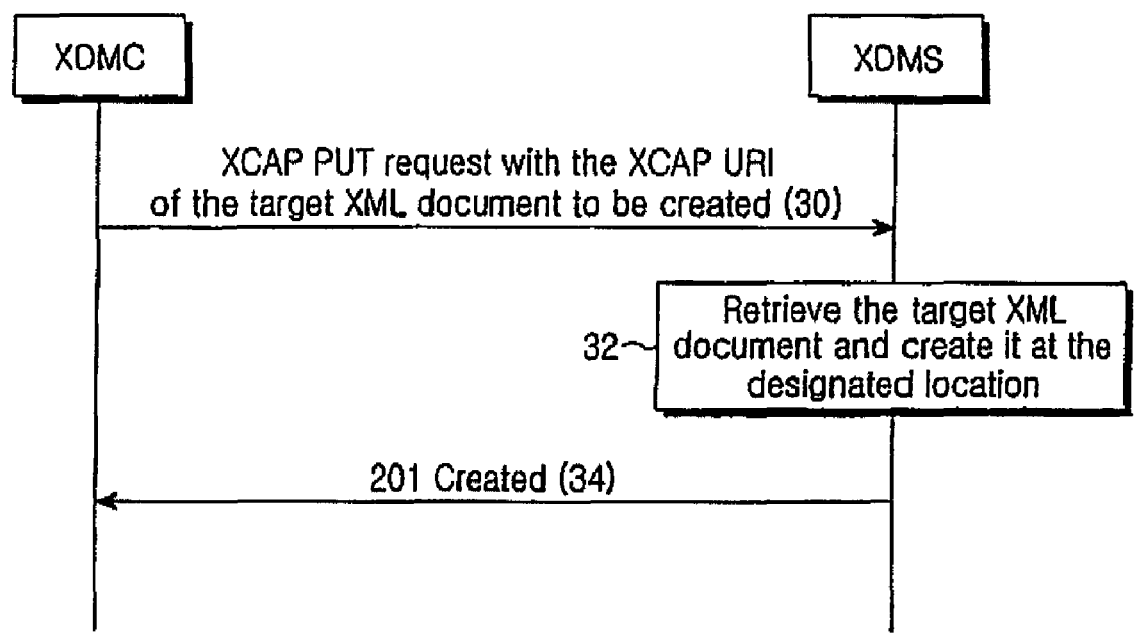
FIG. 3 is a flowchart showing a process for indirectly creating an XML document by using the XCAP URI of an XML document in a single domain according to the present invention.

Even when a plurality of target XML documents have their XCAP URI described in the XCAP PUT request message, as in Tables 4 and 6, the same procedure as in FIGS. 3 and 4 are followed. It is to be noted that the request line of the XCAP PUT request describes nothing further than user directories to be created, instead of the XCAP URI of XML documents to be created, because a plurality of XML documents are to be created. The name of a created XML document is not limited in any manner as long as it is unique in the user directory, and is generally equal to that of the target XML document. In Tables 4 and 6, "source-poc-group.xml" and "source-poc-group2.xml," which have been retrieved from a user directory of "sip:copyee@example.com," may be created and stored in a user directory of "sip:copyer@example.com" as "source-poc-group.xml" and "source-poc-group2.xml," respectively.

Meanwhile, an authorization check regarding a user requesting the creation of an XML document has been omitted for clarity in the above description with reference to FIGS. 3 and 4. However, such a process for checking whether a user requesting the creation of an XML document is authorized to do so is inevitable in actual implementation. As is clear from the exemplary messages, the ID of a requester is transmitted to the XDMS via an "X-XCAP-Asserted-Identify" header or a corresponding header of a different type. Each XDMS performs an authorization check with regard to the request before any operation. In particular, the XDMS checks whether the requester is authorized to create an XML document in the user directory described in the request line of the XCAP PUT request message. The XDMS also checks whether the requester is authorized to retrieve an XML document, which has been described with regard to the XCAP URI of the XML document. When an XCAP GET request message causes a corresponding XML document be retrieved from an XDMS in a different domain, the retrieval authorization may be checked by the XDMS, which has received the XCAT GET request, e.g. XDMS in domain B shown in FIG. 4.

Figure 5:
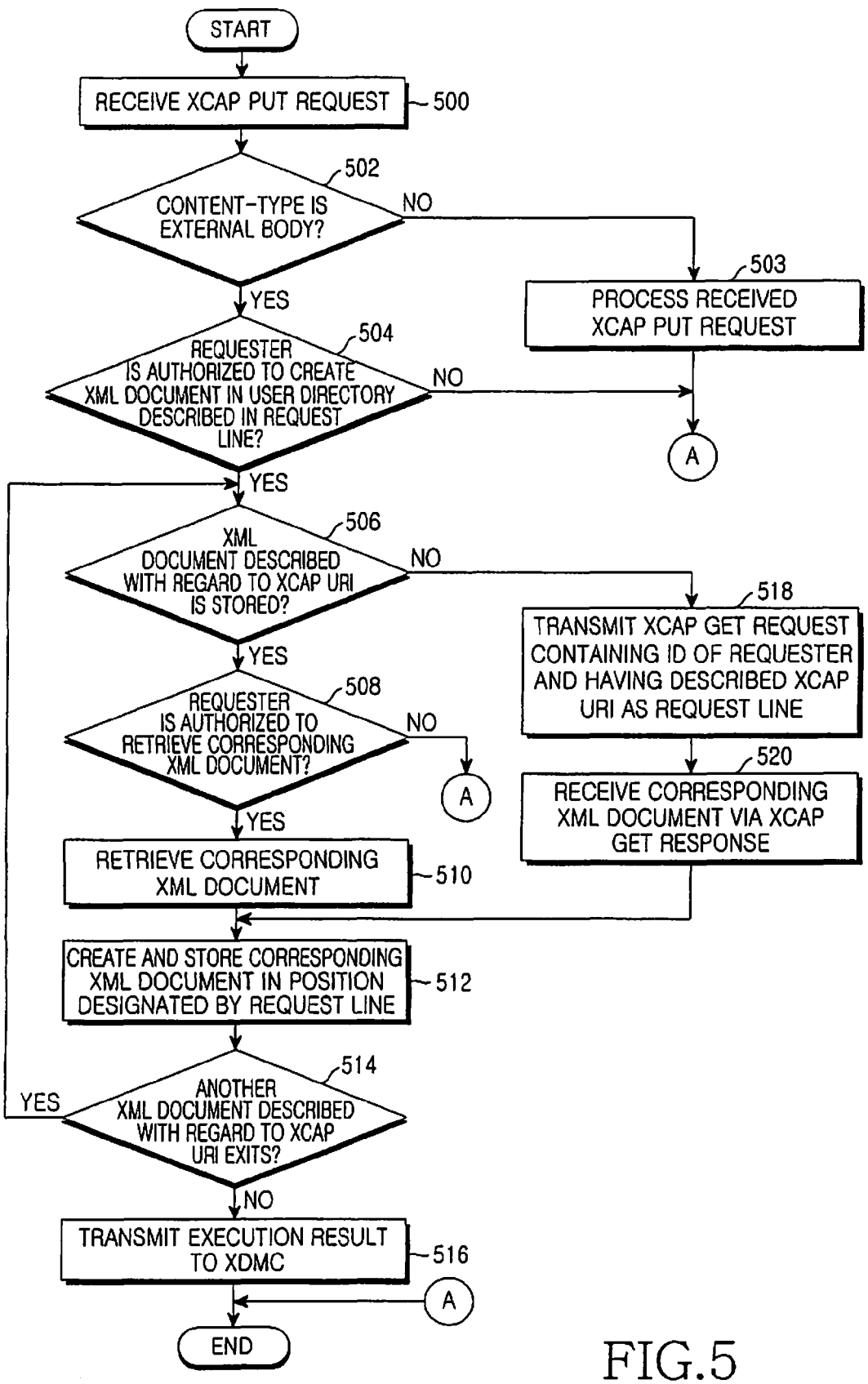
FIG. 5 is a flowchart showing a process for indirectly creating an XML document in an XDMS by using the XCAP URI of an XML document according to the present invention.

A process for receiving an XCAP PUT request message, which contains the XCAP URI corresponding an XML document to be created, from an XDMC by an XDMS, creating the corresponding XML document, and storing the XML document in a designated position will now be described with reference to FIG. 5.

The XDMS receives an XCAP PUT request message in step 500. The XDMS checks whether the "message/external-body Content-Type" of the received XCAP PUT request message corresponds to an external object in step 502. If so, the XDMS proceeds to step 504 and, if not, proceeds to 503, in which the XDMS performs corresponding processing with regard to the received XCAP PUT request message.

After proceeding from step 502 to step 504, the XDMS checks whether the requester is authorized to create an XML document in the user directory described in the request line. The authorization check is based on the ID of the requester contained in the header of the XCAP PUT request message. If it is confirmed in step 504 that the requester is authorized to do so, the XDMS proceeds to step 506 and checks whether an XML document, which has been described with reference to its XCAP URI, is stored therein.

If an XML document described with reference to its XCAP URI is stored, the XDMS proceeds to step 508 and, if not, proceeds to step 518, in which it transmits an XCAP GET request message, which contains the ID of the requester and which has the described XCAP URI in the request line, to the XDMS of the corresponding domain. The XDMS then proceeds to step 520 and, if a response message to the XCAP GET request message, i.e. a response message containing the XML document is received, it proceeds to step 512.

If it is confirmed in step 506 that the XML document described with regard to its XCAP URI has been stored, the XDMS proceeds to step 508 and checks whether the requester is authorized to retrieve the corresponding XML document. The authorization check is based on the ID of the requester contained in the header of the XCAP PUT request message, as in the case of step 504. If the requester is authorized to retrieve the corresponding XML document, the XDMS proceeds to step 510 and retrieves the XML document. Then, the XDMS creates and stores the corresponding XML document in the position designated by the request line in step 512. The XDMS proceeds to step 514 and checks whether there is another XML described with reference to its XCAP URI. If it is confirmed in step 514 that there is another XML described with reference to its XCAP URI, the XDMS proceeds to step 506 and executes a function requested with regard to the XML document. If it is confirmed in step 514 that there is no more XML document described with reference to its XCAP URI, the XDMS proceeds to step 516 and transmits the result of execution to the XDMC (i.e. requester).

As mentioned above, the method provided by the present invention can be used to implement new functions, such as XDM copying and XDM forwarding, of an XDM v2.0 service enabler. The method solves the signaling overhead problem occurring when an XDMC retrieves an XML document, which is already stored in an XDMS, and stores the XML document again in the XDMS (i.e. when redundant information is exchanged). Therefore, the performance of wireless channels and system resources is improved, and the time for processing requests is shortened.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An XDMC (XML (eXtensible Markup Language) Document Management Client) terminal in an XDM (XML Document Management) system for realizing an XML document management function, the XDMC terminal comprising:
a transmitter; and
an XDMC for generating an XCAP (XML Configuration Access Protocol) PUT request message for retrieving an XML document by an XDMS (XDM Server), the XCAP PUT request message including a first XCAP (Uniform Resource Indicator) URI that identifies a first storage position from which the XDMS is to retrieve the XML document and a second XCAP URI that identifies a second storage position to which the retrieved XML document is to be stored by the XDMS, and transmitting the XCAP PUT request message to a corresponding XDMS using the transmitter and not transmitting the XML document itself,
wherein the second XCAP URI is obtained by concatenating an XCAP root URI to an XCAP document selector.

2. The XDMC terminal as claimed in claim 1, wherein the XDMS is adapted to inform the XDMC of a successful creation of the XML document according to the first XCAP URI after retrieving the XML document from the first storage position and storing the XML document in the second storage position.

3. The XDMC terminal as claimed in claim 1, wherein the XDMC is adapted to transmit the XCAP PUT request message to a corresponding XDMS, the XCAP PUT request message containing the first XCAP URI, which identifies a storage position of at least one XML document to be created, and wherein the XDMS is adapted to receive the XCAP PUT request message, retrieve an XML document corresponding to the first XCAP URI contained in the XCAP PUT request message, and store the XML document in the storage position of the at least one XML document to be created.

4. The XDMC terminal as claimed in claim 1, wherein the XCAP URI of the corresponding XML document in the XCAP PUT request message is in the same domain as an XDMS.

5. The XDMC terminal as claimed in claim 1, wherein the XCAP URI of the corresponding XML document in the XCAP PUT request message is in a domain different from that of an XDMS in which a corresponding XML document is to be newly created.

6. The XDMC terminal as claimed in claim 1, wherein the XCAP PUT request message contains at least one of a directory of the XDMC, a user ID, a content type, an access type, an XCAP URI of an XML document to be created, and a size.

7. An XDMC (XML (eXtensible Markup Language) Document Management Client) method for implementing an XML (eXtensible Markup Language) document management function in an XDM (XML Document Management) system having an XDMC and an XDMS (XDM Server), the method comprising the steps of:
(a) generating an XCAP (XDM Configuration Access Protocol) PUT request message for retrieving an XML document by the XDMS, the XCAP PUT request message including a first XCAP (Uniform Resource Indicator) URI that identifies a first storage from which the XDMS is to retrieve the XML document and a second XCAP URI that identifies a second storage position to which the retrieved XML document is to be stored by the XDMS; and
(b) transmitting the XCAP PUT request message to a corresponding XDMS and not transmitting the XML document itself,
wherein the second XCAP URI is obtained by concatenating an XCAP root URI to an XCAP document selector.

8. The method as claimed in claim 7, further comprising informing the XDMC of a successful creation of the XML document according to the first XCAP URI by the XDMS after retrieving the XML document from the first storage position and storing the XML document in the second storage position.

9. The method as claimed in claim 7, wherein the second XCAP URI of the corresponding XML document in the XCAP PUT request message is in the same domain as an XDMS.

10. The method as claimed in claim 7, wherein the second XCAP URI of the corresponding XML document in the XCAP PUT request message is in a domain different from that of an XDMS in which a corresponding XML document is to be newly created.

11. The method as claimed in claim 7, wherein the XCAP PUT request message contains at least one of a directory of the XDMC, a user ID, a content type, an access type, an XCAP URI of an XML document to be created, and a size.

12. The method as claimed in claim 7, further comprising transmitting the XCAP PUT request message containing one of a size and a content type of the XML document.

13. An XDMS (XML (eXtensible Markup Language) Document Management Server) in an XDM (XML Document Management) system for realizing an XML document management function, the XDMS comprising:
a receiving unit for receiving an XCAP (XDM Configuration Access Protocol) PUT request message for retrieving an XML document from an XDMC (XML Document Management Client), the XCAP PUT request message including an XCAP URI (Uniform Resource Identifier) that identifies a first storage position from which the XDMS is to retrieve an XML document and further including a second XCAP URL which is distinct from the first XCAP URI that identifies a second storage position to which the retrieved XML document is to be stored by the XDMS;
a retrieving unit for retrieving the XML document from the first storage position identified by the first XCAP URI included in the XCAP PUT request message; and
a storing unit for storing the retrieved XML document in the second storage position.

14. The XDMS as claimed in claim 13, wherein the XDMS is adapted to recognize that the XCAP PUT request message is a request message for XML creation, check whether the XDMC is authorized to create the XML document in a directory, check whether the XML document corresponding to the XCAP URI is stored when the XDMC is authorized to create the XML document in the directory, check whether the XDMC is authorized to retrieve the XML document corresponding to the XCAP URI when the XML document is stored according to the first XCAP URI, retrieve the XML document according to the first XCAP URI when the XDMC is authorized to retrieve the XML document according to the first XCAP URI, and store the retrieved XML document in the second storage position.

15. The XDMS as claimed in claim 14, wherein the XDMS is adapted to check whether a user is authorized to create the XML document in the directory by using a user ID contained in the XCAP PUT request message and recognize that the XCAP PUT request message is a request message for creating the XML document when a content type contained in the XCAP PUT request message is an external body.

16. The XDMS as claimed in claim 14, wherein the XDMS is adapted to check whether the XML document is stored according to the first XCAP URI is stored, check whether the XDMC is authorized to retrieve a corresponding XML document by using a user ID contained in the XCAP PUT request when the XML document is stored according to the first XCAP URI, retrieve the XML document according to the first XCAP URI when the XDMC is authorized to retrieve the corresponding XML document, transmit an XCAP GET request message to a different XDMS storing the XML document when the XML document is not stored according to the first XCAP URI, and receive an XML document according to the first XCAP URI.

17. A XDMS (XML (eXtensible Markup Language) Document Management Server) method for implementing an XML document management function in an XDM (XML Document Management) system having an XDMC (XML Document Management Client) and an XDMS, the method comprising the steps of:
receiving an XCAP (XDM Configuration Access Protocol) PUT request message for retrieving an XML document from the XDMC, the XCAP PUT request message including a first XCAP URI (Uniform Resource Identifier) that a first storage position from which the XDMS is to retrieve the XML document and a second XCAP URI distinct from the first XCAP URI that identifies a second storage position, which is distinct from the first storage position, to which the retrieved XML document is to be stored by the XDMS;

retrieving the XML document from the first storage position identified by the first XCAP URI included in the XCAP PUT request message; and storing the XML document in the second storage position included in the XCAP PUT request message.

18. The method as claimed in claim 17, further comprising:
recognizing that the XCAP PUT request message is a request message for creating the XML document when the XDMS receives the XCAP PUT request message;
checking whether the XDMC is authorized to create the XML document in a directory;
checking whether the XML document is stored according to the first XCAP URI when the XDMC is authorized to create the XML document in the directory;
checking whether the XDMC is authorized to retrieve a corresponding XML document when the XML document is stored according to the first XCAP URI; and
retrieving the XML document according to the first XCAP URI and storing the retrieved XML document in the second storage position when the XML document is stored according to the first XCAP URI and when the XDMC is authorized to retrieve the corresponding XML document.

19. The method as claimed in claim 18, further comprising:
transmitting an XCAP GET request message to a different XDMS storing the XML document according to the first XCAP URI, when the XML document is not stored in the XDMS according to the first XCAP URI, and receiving the XML document according to the XCAP URI;
checking if the XDMC is authorized to retrieve a corresponding XML document by using a user ID contained in the XCAP PUT request when the XML document is stored in the XDMS according to the first XCAP URI; and
retrieving the XML document according to the first XCAP URI when the XDMC is authorized to retrieve the corresponding XML document.

20. The method as claimed in claim 18, wherein, in recognizing that the XCAP PUT request message is a request message for creating the XML document, the XDMS checks a content type contained in the XCAP PUT request message and, when the content type is an external body, recognizes that the XCAP PUT request message is a request message for creating the XML document, and wherein in the step of checking if the XDMC is authorized to create an XML document in a directory, a user ID contained in the XCAP PUT request message is used to check if a user is authorized to create the XML document in the directory.

* * * * *